United States Patent
Furuta et al.

(10) Patent No.: US 8,048,981 B2
(45) Date of Patent: *Nov. 1, 2011

(54) THERMALLY CURABLE COMPOSITIONS AND METHOD

(75) Inventors: Paul Takao Furuta, Niskayuna, NY (US); Michael Joseph O'Brien, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 1377 days.

This patent is subject to a terminal disclaimer.

(21) Appl. No.: 11/509,965

(22) Filed: Aug. 25, 2006

(65) Prior Publication Data
US 2008/0051553 A1    Feb. 28, 2008

Related U.S. Application Data

(63) Continuation-in-part of application No. 11/235,624, filed on Sep. 20, 2005.

(51) Int. Cl.
*C08G 59/00* (2006.01)
(52) U.S. Cl. ..................................... 528/403
(58) Field of Classification Search .................. None
See application file for complete search history.

(56) References Cited

U.S. PATENT DOCUMENTS

| | | | |
|---|---|---|---|
| 4,283,312 A | 8/1981 | Crivello | |
| 4,329,306 A | 5/1982 | Crivello | |
| 4,689,427 A * | 8/1987 | Imfeld | 560/144 |
| 4,992,571 A | 2/1991 | Fukuyama et al. | |
| 5,326,873 A * | 7/1994 | Godleski et al. | 544/401 |
| 5,393,867 A * | 2/1995 | Matayabas et al. | 528/412 |
| 6,512,606 B1 | 1/2003 | Lipson et al. | |
| 6,962,948 B2 | 11/2005 | Ghoshal | |
| 2002/0183516 A1 * | 12/2002 | Denmark et al. | 540/555 |
| 2003/0152842 A1 | 8/2003 | Cetin et al. | |
| 2005/0042458 A1 | 2/2005 | Ghoshal | |
| 2005/0239295 A1 | 10/2005 | Wang et al. | |
| 2007/0066698 A1 * | 3/2007 | Yang et al. | 522/6 |

OTHER PUBLICATIONS

Pattison, "Cyclic Ethers Made by Pyrolysis of Carbonate Esters", Journal of American Chemical Society, vol. 79, pp. 3455-3456, Jul. 5, 1957.

Kryger et al., "Radicals and Scavengers. 7. Diffusion Controlled Scavenging of Phenyl Radicals and Absolute Rate Constants of Several Phenyl Radical Reactions", Journal of American Chemical Society, vol. 99, No. 23, pp. 7589-7600, Nov. 9, 1977.

Crivello et al., "Diaryliodonium Salts as Thermal Initiators of Cationic Polymerizations", Journal of Polymer Science, Polymer Chemistry Edition, vol. 21, pp. 97-109, 1983.

Crivello, et al., "Alkoxy-Substituted Diaryliodonium Salt Cationic Photoinitiators", Journal of Polymer Science, Part A, Polymer Chemistry, vol. 27, pp. 3951-3968, 1989.

Yang et al., Dual cure compositions, methods of curing thereof, and articles therefrom, copending U.S. Appl. No. 11/235,624, filed Sep. 20, 2005, GE Docket No. 162326.

* cited by examiner

*Primary Examiner* — John J Figueroa
(74) *Attorney, Agent, or Firm* — Mary Louise Gioeni

(57) ABSTRACT

Disclosed are thermally curable compositions comprising at least one cyclic ether, an initiator selected from the group consisting of an iodonium salt, a sulfonium salt, an acylium salt, a tropylium salt, an oxonium salt, and combinations thereof, and a catalyst having structure $Pd(Q)_2$, wherein Q is at least one ligand selected from the group consisting of a carboxylate, a halide, a ketoester, an ester, a ketone, an hydroxyl, and combinations thereof. Disclosed also are methods of curing the thermally curable compositions, and articles made therefrom. Curing methods comprise heating the composition to a suitable temperature for a period of time. Articles may comprise coated articles, shaped articles or shaped components. Compositions and methods may also be used for composite repair applications.

27 Claims, No Drawings

THERMALLY CURABLE COMPOSITIONS AND METHOD

CROSS-REFERENCE TO RELATED APPLICATIONS

This application is a continuation-in-part of prior U.S. application Ser. No. 11/235,624, filed on 20 Sep. 2005.

BACKGROUND

The invention is related to thermally curable compositions and methods of curing.

Ring opening polymerization of cyclic ethers may be achieved by the use of several known initiator systems. Typically, cyclic ethers are polymerized using cationic initiators, except for the 3-membered cyclic ethers (hereinafter sometimes referred to as "epoxides"), whose polymerization may be initiated both by cationic as well as anionic initiators. Strong protonic acids, Lewis acids, optionally in the presence of cationogens such as alkyl halide or acyl halide, are known to initiate cationic polymerization of cyclic ethers. The initiators may also be activated by an energy source. The source of energy may be thermal, or electromagnetic, such as light, e-beam, neutron beam, and the like. The initiator, once energized, will dissociate to form excited species, which then proceed to initiate the polymerization of the cyclic ether monomer.

Polymerization of cyclic ether monomers propagates by the formation of an oxonium ion, which then is subjected to a nucleophilic attack on the carbon adjacent to the oxonium ion by an oxygen of another monomer. High molecular weight polymers with narrow molecular weight distributions may be obtained by cationic polymerization of cyclic ethers. However, cyclic ether polymerizations are subject to chain transfer reactions that may limit the molecular weight and/or broaden the molecular weight distribution of the resulting polymer. Also, termination of polymerization may be effected by the addition of specific end capping agents, or it may occur due to any of the agents already present in the reaction mixture, such as the counterion of the initiator.

The thermal initiation of polymerization of cyclic ethers has been reported before. See for example J. V. Crivello, et al. J. Polym. Sci.: Part A: Polym Chem., vol. 27, pp 3951-3968 (1989) and J. V. Crivello, et al., J. Polym. Sci.: Polym. Chem. Ed., vol. 21, pp 97-109 (1983). The initiation however required copper (II) catalysts. The mechanism for the initiation has also been speculated in those publications. Crivello et al. clearly state in the publication that " . . . other metal salts, such as those of Ni(II), Co(II), Fe(II), Ag(I), Mn(III), Cr(III) and Pd(II), have been examined as catalysts for the reduction of diaryliodonium salts, thus far only copper compounds have been found to be effective". Also, thermal curing requires high temperatures and difficult processing conditions. Low temperature cures are also initiated by non thermal methods, such as UV or e-beam radiation. But the other forms of radiations have issues with depth penetration. Thermal, free radical initiators may also be able to activate cationic initiators at low temperatures, but are undesirable due to outgassing of decomposition products that can create voids in cured resin, reduced shelf life at room temperature, and competing reactions that can retard the initiation and curing reactions. Thus, there is a need for compositions that are stable at ambient temperatures, but may be thermally cured at temperatures less than about 100° C., preferably less than about 90° C.

BRIEF DESCRIPTION

In one aspect, the invention provides a thermally curable composition comprising: (i) a cyclic ether; (ii) an initiator selected from the group consisting of an iodonium salt, a sulfonium salt, an acylium salt, a tropylium salt, an oxonium salt, and combinations thereof; and (iii) a catalyst having structure $Pd(Q)_2$, wherein Q is at least one ligand selected from the group consisting of a carboxylate, a halide, a ketoester, an ester, a ketone, an hydroxyl, and combinations thereof.

In another aspect, the invention provides a method of curing an epoxy composition comprising the steps of: (A) providing a curable composition comprising (i) a cyclic ether, (ii) an initiator selected from the group consisting of an iodonium salt, a sulfonium salt, an acylium salt, a tropylium salt, an oxonium salt, and combinations thereof, and (iii) a catalyst having structure $Pd(Q)_2$, wherein Q is at least one ligand selected from the group consisting of a carboxylate, a halide, a ketoester, an ester, a ketone, an hydroxyl, and combinations thereof; and (B) heating the curable composition at a temperature and for a period of time to effect curing.

The present inventors have surprisingly discovered the effectiveness of Pd(II) compounds taught herein in the thermal initiation of cyclic ether polymerization. Further, it has been found that the thermal initiation in the presence of Pd(II) compounds disclosed herein occurs at temperatures lower than those of the copper compounds without compromising on the shelf-life of the compositions. Articles comprising or derived from thermally curable compositions described herein are also within the scope of the invention.

Various other features, aspects, and advantages of the present invention will become more apparent with reference to the following description and appended claims.

DETAILED DESCRIPTION

In the following specification and the claims which follow, reference will be made to a number of terms which shall be defined to have the following meanings. The singular forms "a", "an" and "the" include plural referents unless the context clearly dictates otherwise.

Other than in the operating examples or where otherwise indicated, all numbers or expressions referring to quantities of ingredients, reaction conditions, and the like, used in the specification and claims are to be understood as modified in all instances by the term "about." Various numerical ranges are disclosed in this patent application. Because these ranges are continuous, they include every value between the minimum and maximum values, and include the minimum and maximum values.

"Ligand", as used herein, is any moiety capable of bonding to a metal ion. Ligands can be charged or neutral, and may range widely in structure, including simple monovalent donors, such as, but not limited to, chloride, or simple amines which form a single coordinate bond and a single point of attachment to a metal; to oxygen or ethylene, which can form a three-membered ring with a metal and thus in some embodiments have two potential points of attachment, to larger moieties such as ethylenediamine or aza macrocycles, which form up to the maximum number of single bonds to one or more metals that is allowed by the available sites on the metal and the number of lone pairs or alternate bonding sites of the free ligand. Numerous ligands can form bonds other than simple donor bonds, and can have multiple points of attachment. When an amine or other basic species is employed as ligand, then in particular embodiments of the invention wither the concentration or basicity of the species is not such that curing of the thermally curable composition is significantly inhibited.

As used herein, the term "aromatic" or "aryl" radical refers to an array of atoms having a valence of at least one comprising at least one aromatic group. The array of atoms having a valence of at least one comprising at least one aromatic group may include heteroatoms such as nitrogen, sulfur, selenium, silicon and oxygen, or may be composed exclusively of carbon and hydrogen. As used herein, the term "aromatic radical" includes but is not limited to phenyl, pyridyl, furanyl, thienyl, naphthyl, phenylene, and biphenyl radicals. As noted, the aromatic radical contains at least one aromatic group. The aromatic group is invariably a cyclic structure having $4n+2$ "delocalized" electrons where "n" is an integer equal to 1 or greater, as illustrated by phenyl groups (n=1), thienyl groups (n=1), furanyl groups (n=1), naphthyl groups (n=2), azulenyl groups (n=2), anthraceneyl groups (n=3), and the like. The aromatic radical may also include nonaromatic components. For example, a benzyl group is an aromatic radical which comprises a phenyl ring (the aromatic group) and a methylene group (the nonaromatic component). Similarly a tetrahydronaphthyl radical is an aromatic radical comprising an aromatic group $(C_6H_3)$ fused to a nonaromatic component $-(CH_2)_4-$. For convenience, the term "aromatic radical" is defined herein to encompass a wide range of functional groups such as alkyl groups, alkenyl groups, alkynyl groups, haloalkyl groups, haloaromatic groups, conjugated dienyl groups, alcohol groups, ether groups, aldehyde groups, ketone groups, carboxylic acid groups, acyl groups (for example carboxylic acid derivatives such as esters and amides), amine groups, nitro groups, and the like. For example, the 4-methylphenyl radical is a $C_7$ aromatic radical comprising a methyl group, the methyl group being a functional group which is an alkyl group. Similarly, the 2-nitrophenyl group is a $C_6$ aromatic radical comprising a nitro group, the nitro group being a functional group. Aromatic radicals include halogenated aromatic radicals such as 4-trifluoromethylphenyl, hexafluoroisopropylidenebis(4-phen-1-yloxy) (i.e., $-OPhC(CF_3)_2PhO-$), 4-chloromethylphen-1-yl, 3-trifluorovinyl-2-thienyl, 3-trichloromethylphen-1-yl (i.e., 3-$CCl_3$Ph-), 4-(3-bromoprop-1-yl)phen-1-yl (i.e., 4-$BrCH_2CH_2CH_2$Ph-), and the like. Further examples of aromatic radicals include 4-allyloxyphen-1-oxy, 4-aminophen-1-yl (i.e., 4-$H_2$NPh-), 3-aminocarbonylphen-1-yl (i.e., 3-$NH_2$COPh-), 4-benzoylphen-1-yl, dicyanomethylidenebis(4-phen-1-yloxy) (i.e., $-OPhC(CN)_2PhO-$), 3-methylphen-1-yl, methylenebis(4-phen-1-yloxy) (i.e., $-OPhCH_2PhO-$), 2-ethylphen-1-yl, phenylethenyl, 3-formyl-2-thienyl, 2-hexyl-5-furanyl, hexamethylene-1,6-bis(4-phen-1-yloxy) (i.e., $-OPh(CH_2)_6PhO-$), 4-hydroxymethylphen-1-yl (i.e., 4-$HOCH_2$Ph-), 4-mercaptomethylphen-1-yl (i.e., 4-$HSCH_2$Ph-), 4-methylthiophen-1-yl (i.e., 4-$CH_3$SPh-), 3-methoxyphen-1-yl, 2-methoxycarbonylphen-1-yloxy (e.g., methyl salicyl), 2-nitromethylphen-1-yl (i.e., 2-$NO_2CH_2$Ph), 3-trimethylsilylphen-1-yl, 4-t-butyldimethylsilylphen-1-yl, 4-vinylphen-1-yl, vinylidenebis (phenyl), and the like. The term "a $C_3$-$C_{10}$ aromatic radical" includes aromatic radicals containing at least three but no more than 10 carbon atoms. The aromatic radical 1-imidazolyl($C_3H_2N_2-$) represents a $C_3$ aromatic radical. The benzyl radical ($C_7H_7-$) represents a $C_7$ aromatic radical.

As used herein the term "cycloaliphatic" or "cycloalkyl" radical refers to a radical having a valence of at least one, and comprising an array of atoms which is cyclic but which is not aromatic. As defined herein a "cycloaliphatic radical" does not contain an aromatic group. A "cycloaliphatic radical" may comprise one or more noncyclic components. For example, a cyclohexylmethyl group ($C_6H$, $CH_2-$) is a cycloaliphatic radical which comprises a cyclohexyl ring (the array of atoms which is cyclic but which is not aromatic) and a methylene group (the noncyclic component). The cycloaliphatic radical may include heteroatoms such as nitrogen, sulfur, selenium, silicon or oxygen, or may be composed exclusively of carbon and hydrogen. For convenience, the term "cycloaliphatic radical" is defined herein to encompass a wide range of functional groups such as alkyl groups, alkenyl groups, alkynyl groups, haloalkyl groups, conjugated dienyl groups, alcohol groups, ether groups, aldehyde groups, ketone groups, carboxylic acid groups, acyl groups (for example carboxylic acid derivatives such as esters and amides), amine groups, nitro groups, and the like. For example, the 4-methylcyclopent-1-yl radical is a $C_6$ cycloaliphatic radical comprising a methyl group, the methyl group being a functional group which is an alkyl group. Similarly, the 2-nitrocyclobut-1-yl radical is a $C_4$ cycloaliphatic radical comprising a nitro group, the nitro group being a functional group. A cycloaliphatic radical may comprise one or more halogen atoms which may be the same or different. Halogen atoms include, for example, fluorine, chlorine, bromine, and iodine. Cycloaliphatic radicals comprising one or more halogen atoms include 2-trifluoromethylcyclohex-1-yl, 4-bromodifluoromethylcyclooct-1-yl, 2-chlorodifluoromethylcyclohex-1-yl, hexafluoroisopropylidene-2,2-bis(cyclohex-4-yl) (i.e., $-C_6H_{10}C(CF_3)_2C_6H_{10}-$), 2-chloromethylcyclohex-1-yl, 3-difluoromethylenecyclohex-1-yl, 4-trichloromethylcyclohex-1-yloxy, 4-bromodichloromethylcyclohex-1-ylthio, 2-bromoethylcyclopent-1-yl, 2-bromopropylcyclohex-1-yloxy (e.g., $CH_3CHBrCH_2C_6H_{10}O-$), and the like. Further examples of cycloaliphatic radicals include 4-allyloxycyclohex-1-yl, 4-aminocyclohex-1-yl (i.e., 4-$H_2C_6H_{10}-$), 4-aminocarbonylcyclopent-1-yl (i.e., 4-$NH_2COC_5H_8-$), 4-acetyloxycyclohex-1-yl, 2,2-dicyanoisopropylidenebis(cyclohex-4-yloxy) (i.e., $-OC_6H_{10}C(CN)_2C_6H_{10}O-$), 3-methylcyclohex-1-yl, methylenebis(cyclohex-4-yloxy) (i.e., $-OC_6H_{10}CH_2C_6H_{10}O-$), 1-ethylcyclobut-1-yl, cyclopropylethenyl, 3-formyl-2-terahydrofuranyl, 2-hexyl-5-tetrahydrofuranyl, hexamethylene-1,6-bis(cyclohex-4-yloxy) (i.e., $-OC_6H_{10}(CH_2)_6C_6H_{10}O-$), 4-hydroxymethylcyclohex-1-yl (i.e., 4-$HOCH_2C_6H_{10}-$), 4-mercaptomethylcyclohex-1-yl (i.e., 4-$HSCH_2C_6H_{10}-$), 4-methylthiocyclohex-1-yl (i.e., 4-$CH_3SC_6H_{10}-$), 4-methoxycyclohex-1-yl, 2-methoxycarbonylcyclohex-1-yloxy(2-$CH_3OCOC_6H_{10}O-$), 4-nitromethylcyclohex-1-yl (i.e., $NO_2CH_2C_6H_{10}-$), 3-trimethylsilylcyclohex-1-yl, 2-t-butyldimethylsilylcyclopent-1-yl, 4-trimethoxysilylethylcyclohex-1-yl (e.g., 4-$(CH_3O)_3SiCH_2CH_2C_6H_{10}-$), 4-vinylcyclohexen-1-yl, vinylidenebis (cyclohexyl), and the like. The term "a $C_3$-$C_{10}$ cycloaliphatic radical" includes cycloaliphatic radicals containing at least three but no more than 10 carbon atoms. The cycloaliphatic radical 2-tetrahydrofuranyl($C_4H_7O-$) represents a $C_4$ cycloaliphatic radical. The cyclohexylmethyl radical ($C_6H_{11}CH_2-$) represents a $C_7$ cycloaliphatic radical.

As used herein the term "aliphatic" or "alkyl" radical refers to an organic radical having a valence of at least one consisting of a linear or branched array of atoms which is not cyclic. Aliphatic radicals are defined to comprise at least one carbon atom. The array of atoms comprising the aliphatic radical may include heteroatoms such as nitrogen, sulfur, silicon, selenium or oxygen, or may be composed exclusively of carbon and hydrogen. For convenience, the term "aliphatic radical" is defined herein to encompass, as part of the "linear or branched array of atoms which is not cyclic" a wide range of functional groups such as alkyl groups, alkenyl groups, alkynyl groups, haloalkyl groups, conjugated dienyl groups, alcohol groups, ether groups, aldehyde groups, ketone groups, carboxylic acid groups, acyl groups (for example carboxylic acid derivatives such as esters and amides), amine groups, nitro groups, and the like. For example, the 4-methylpent-1-yl radical is a $C_6$ aliphatic radical comprising a methyl group, the methyl group being a functional group which is an alkyl group. Similarly, the 4-nitrobut-1-yl group is a $C_4$ aliphatic radical comprising a nitro group, the nitro group being a functional group. An aliphatic radical may be a haloalkyl group which comprises one or more halogen atoms which may be the same or different. Halogen atoms include, for example; fluorine, chlorine, bromine, and iodine. Aliphatic radicals comprising one or more halogen atoms include the alkyl halides trifluoromethyl, bromodifluoromethyl, chlorodifluoromethyl, hexafluoroisopropylidene, chloromethyl, difluorovinylidene, trichloromethyl, bromodichloromethyl, bromoethyl, 2-bromotrimethylene (e.g., —$CH_2CHBrCH_2$—), and the like. Further examples of aliphatic radicals include allyl, aminocarbonyl (i.e., —$CONH_2$), carbonyl, 2,2-dicyanoisopropylidene (i.e., —$CH_2C(CN)_2CH_2$—), methyl (i.e., —$CH_3$), methylene (i.e., —$CH_2$—), ethyl, ethylene, formyl (i.e., —CHO), hexyl, hexamethylene, hydroxymethyl (i.e., —$CH_2OH$), mercaptomethyl (i.e., —$CH_2SH$), methylthio (i.e., —$SCH_3$), methylthiomethyl (i.e., —$CH_2SCH_3$), methoxy, methoxycarbonyl (i.e., $CH_3OCO$—), nitromethyl (i.e., —$CH_2NO_2$), thiocarbonyl, trimethylsilyl (i.e., $(CH_3)_3Si$—), t-butyldimethylsilyl, 3-trimethyoxysilylpropyl (i.e., $(CH_3O)_3SiCH_2CH_2CH_2$—), vinyl, vinylidene, and the like. By way of further example, a $C_1$-$C_{10}$ aliphatic radical contains at least one but no more than 10 carbon atoms. A methyl group (i.e., $CH_3$—) is an example of a $C_1$ aliphatic radical. A decyl group (i.e., $CH_3(CH_2)_9$—) is an example of a $C_{10}$ aliphatic radical.

As noted, the present invention relates to thermally curable compositions. The compositions comprise a cyclic ether compound. Cyclic ether compounds are known in the art, and are named depending on the size of the ring system. Thus, a three-membered cyclic ether may be referred to as oxacyclopropanes, or oxiranes or epoxies or epoxides. Similarly, a four-membered cyclic ether may be referred to as oxacyclobutanes, oxetanes or trimethylene oxides. It may be recognized by one in the art that any derivatives of a three-membered cyclic ether will be referred to as epoxy derivatives, and derivatives of four-membered cyclic ethers will be referred to as oxetane derivatives, and so on.

Epoxy compounds useful in the invention include, but are not limited to, 3,4-epoxycyclohexyl-3',4'-epoxycyclohexane carboxylate, also known as 7-oxabicyclo[4.1.0]hept-3-ylmethyl 7-oxabicyclo[4.1.0]heptane-3-carboxylate), bis(3,4-epoxycyclohexyl) adipate, 4-vinylcyclohexene dioxide, limonene dioxide, dicyclopentadiene dioxide, 1,2-epoxytetradecane, 1,2-epoxydecane, 1,2-epoxydodecane; glycidyl ethers including bisphenol-A diglycidyl ether, bisphenol-F diglycidyl ether, and their extended chain analogs, 1,4-butanediol diglycidyl ether; brominated epoxy resins such as diglycidyl ethers of tetrabromo-bisphenol-A; epoxy cresol novolacs; epoxy phenol novolacs; epoxidized vegetable oils such as epoxidized soybean oil and epoxidized linseed oil; and glycidyl ester resins, as for example, diglycidyl phthalate, and the like, and mixtures thereof.

Further, epoxy compounds of the invention may include compounds having the following formula: $(Ep)_x$-$R^1$, wherein Ep represents an epoxy containing moiety, wherein $R^1$ may be a $C_1$-$C_{40}$ aliphatic radical, a $C_3$-$C_{40}$ aromatic radical, or a $C_4$-$C_{40}$ cycloaliphatic radical; and x is an integer ranging from 2 to 10. Examples of compounds wherein x=2 comprise 1,4-butanediol diglycidyl ether, 1,4-xylylene glycol diglycidyl ether; wherein x=3 comprise trimethylol propane triglycidyl ether, glycerol triglycidyl ether; wherein x=4 comprise pentaerythritol tetraglycidyl ether; wherein x=6 comprise dipentaerythritol hexaglycidyl ether.

In some embodiments, the cyclic ether may comprise siloxane groups having formula —O—Si—. Siloxane epoxy resins useful in the present invention comprise those known in the art. In some embodiments, siloxane epoxy resins comprise at least one silicon moiety selected from the group consisting of $R_3SiO_{0.5}$ (M moieties), $R_2SiO$ (D moieties), $RSiO_{1.5}$ (T moieties), and $SiO_2$ (Q moieties), in combination with at least one epoxy-containing siloxane moiety selected from the group consisting of $EpR_2SiO_{0.5}$, $EpRSiO$, and $EpSiO_{1.5}$, wherein Ep is an epoxy moiety selected from the group consisting of a glycidoxy propyl moiety as in formula (I), a 3,4-epoxycyclohexane ethyl moiety as in formula (II), and a 1,2-epoxy hexyl moiety as in formula (III):

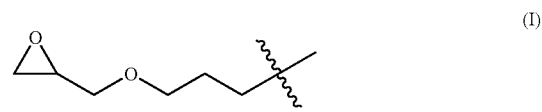

(I)

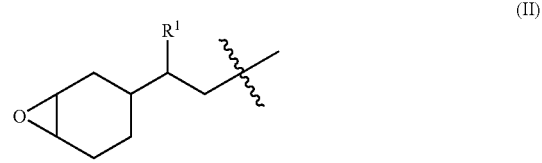

(II)

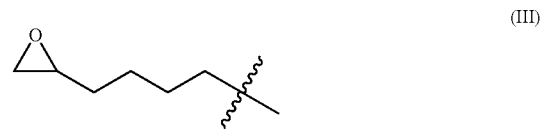

(III)

wherein R is monovalent aliphatic or aromatic radical, and $R^1$ is hydrogen or an aliphatic radical. In some embodiments R is selected from the group consisting of methyl, 3,3,3-trifluoropropyl, phenyl, and mixtures thereof. In some embodiments $R^1$ is either hydrogen or methyl. In particular embodiments silicone epoxy resins comprise those depicted in formulas (IV), (V), (VI), (VII), and (VIII):

(IV)

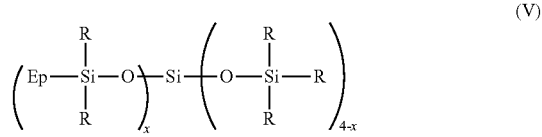

(V)

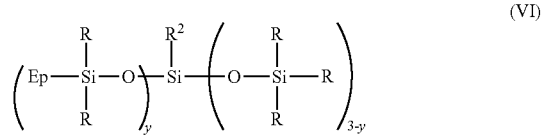

(VI)

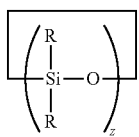
(VII)

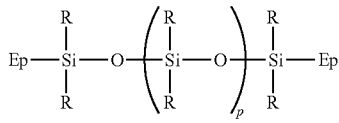
(VIII)

wherein the abbreviation "Ep" designates an epoxy-containing residue comprising any of the epoxy structures depicted in formulas (I), (II), or (III); R is as previously defined; $R^2$ is a monovalent aliphatic or aromatic radical; x is an integer between 1 and 4 inclusive; y is an integer between 1 and 3 inclusive; z is an integer between 3 and 12 inclusive; and p is an integer having a value of 1 to about 80. In certain embodiments R in formulas (IV)-(VIII) is methyl. In a particular embodiment of formula (IV) R is methyl and Ep has the structure of formula (II) in which $R^1$ is hydrogen. In another particular embodiment of formula (IV) R is methyl and Ep has the structure of formula (I). In still another particular embodiment of formula (IV) R is methyl and Ep has the structure of formula (II) in which $R^1$ is methyl. In still another particular embodiment of formula (IV) R is methyl and Ep has the structure of formula (III). In certain embodiments of formula (V) R is methyl and Ep has the structure of formula (II) in which $R^1$ is hydrogen. In another particular embodiment of formula (V) R is methyl, x has the value of 4, and Ep has the structure of formula (II) in which $R^1$ is hydrogen. In certain embodiments of formula (VI) R is methyl, $R^2$ is methyl or phenyl, and Ep has the structure of formula (II) in which $R^1$ is hydrogen. In another particular embodiment of formula (VI) R is methyl, $R^2$ is methyl, y has the value of 3, and Ep has the structure of formula (II) in which $R^1$ is hydrogen. In still another particular embodiment of formula (VI) R is methyl, $R^2$ is phenyl, y has the value of 3, and Ep has the structure of formula (II) in which $R^1$ is hydrogen. In a particular embodiment of formula (VII) R is methyl, z has the value of 4, and Ep has the structure of formula (II) in which $R^1$ is hydrogen. In certain embodiments of formula (VIII) Ep has the structure of formula (II) in which $R^1$ is hydrogen, and p is an integer between about 1 and about 70. In another embodiment of formula (VIII) Ep has the structure of formula (II) in which $R^1$ is hydrogen, and p is an integer between about 2 and about 70. In still another embodiment of structure (VIII) Ep has the structure of formula (II) in which $R^1$ is hydrogen, and p is an integer between about 50 and about 70. In still another embodiment of formula (VI) Ep has the structure of formula (II) in which $R^1$ is hydrogen, and p is an integer between about 2 and about 5. In still another embodiment of formula (VIII) Ep has the structure of formula (II) in which $R^1$ is hydrogen, and p has the value of 2.

Epoxy compounds of the invention are commercially available from several sources. For example, epoxycyclohexylmethyl-3',4'-epoxycyclohexane carboxylate is available from Dow Chemicals as ERL® 4221E, while bis(3,4-cyclohexyl) adipate is available from Dow Chemicals as ERL® 4299, and 1,1,3,3-tetramethyl-1,3-bis[2-(7-oxabicyclo[4.1.0]hept-3-yl)ethyl]disiloxane is available from Polyset Co. as PC-1000. Other epoxides which are readily available include octadecylene oxide, epichlorohydrin, styrene oxide, vinyl cyclohexene oxide, glycidol, glycidyl methacrylate, diglycidyl ether of bisphenol A (e.g., those available under the trade designations "EPON® 828", "EPON® 825", "EPON® 1004" and "EPON® 1010" from Shell Chemical Co., "D.E.R® 331", "D.E.R® 332", and "D.E.R® 334", from Dow Chemical Co.), vinylcyclohexene dioxide, bis(3,4-epoxy-6-methylcyclohexylmethyl)adipate, bis(2,3-epoxycyclopentyl)ether, aliphatic epoxy modified from polypropylene glycol, dipentene dioxide, epoxidized polybutadiene (e.g., "OXIRON® 2001" from FMC Corp.), silicone resin containing epoxy functionality, flame retardant epoxy resins (e.g., "D.E.R® 580", a brominated bisphenol type epoxy resin available from Dow Chemical Co.), 1,4-butanediol diglycidyl ether of phenolformaldehyde novolak (e.g., "D.E.N® 431" and "DEN-438" from Dow Chemical Co.), and resorcinol diglycidyl ether (e.g., "KOPOXITE®" from Koppers Company, Inc.), bis(3,4-epoxycyclohexyl)adipate, 2-(3,4-epoxycyclohexyl-5,5-spiro-3,4-epoxy) cyclohexane metadioxane, vinylcyclohexene monoxide 1,2-epoxyhexadecane, alkyl glycidyl ethers such as alkyl C—C, glycidyl ether (e.g., "HELOXY® Modifier 7" from Shell Chemical Co.), alkyl $C_{12}$-$C_{14}$ glycidyl ether (e.g., "HELOXY® Modifier 8" from Shell Chemical Co.), butyl glycidyl ether (e.g., "HELOXY® Modifier 61" from Shell Chemical Co.), cresyl glycidyl ether (e.g., "HELOXY® Modifier 62" from Shell Chemical Co.), p-tertiary butylphenyl glycidyl ether (e.g., "HELOXY® Modifier 65" from Shell Chemical Co.), polyfunctional glycidyl ethers such as diglycidyl ether of 1,4-butanediol (e.g., "HELOXY® Modifier 67" from Shell Chemical Co.), diglycidyl ether of neopentyl glycol (e.g., "HELOXY® Modifier 68" from Shell Chemical Co.), diglycidyl ether of cyclohexanedimethanol (e.g., "HELOXY® Modifier 107" from Shell Chemical Co.), trimethylol ethane triglycidyl ether (e.g., "HELOXY® Modifier 44" from Shell Chemical Co.), trimethylol propane triglycidyl ether (e.g., "HELOXY® Modifier 48" from Shell Chemical Co.), polyglycidyl ether of an aliphatic polyol (e.g., "HELOXY® Modifier 84" from Shell Chemical Co.), polyglycol diepoxide (e.g., "HELOXY® Modifier 32" from Shell Chemical Co.), bisphenol F epoxides, 9,9-bis[4-(2,3-epoxypropoxy)-phenyl]fluorenone (e.g., "EPON® 1079" from Shell Chemical Co.). Alternately, epoxy compounds of the invention may be synthesized by the appropriate techniques known to those skilled in the art. Siloxane containing epoxy compounds are often derived from hydrosilylation of an appropriate olefinic epoxy compound with Si—H containing moiety.

As noted, an oxetane compound represented by formula (IX) is also contemplated as being part of the composition.

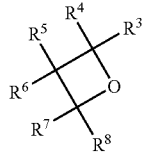
(IX)

In formula (IX), $R^3$ through $R^8$ are independently at each occurrence a hydrogen atom, a functional group, or a monovalent aliphatic radical, monovalent aromatic radical, or a monovalent cycloaliphatic radical. Exemplary radicals represented by $R^3$ through $R^8$ comprise methyl, ethyl, propyl, isopropyl, tert-butyl, pentyl, hexyl, octyl, dodecyl, tridecyl, tetradecyl, pentadecyl, cyclopentyl, cyclohexyl, vinyl, 1-propenyl, 2-propenyl, 2-butenyl, allyl, acetylenyl, 1-propynyl, 2-propynyl, 2-butynyl, propargyl, methoxy, ethoxy, propyloxy, pentyloxy, hexyloxy, octyloxy, dodecyloxy, cyclopentyloxy, cyclohexyloxy, methyloxycarbonyl, ethyloxycarbonyl, butyloxycarbonyl, octyloxycarbonyl, dodecyloxycarbonyl, acetyloxy, ethylcarbonyloxy, butylcarbonyloxy, octylcarbonyloxy, dodecylcarbonyloxy, phenylcarbonyloxy, phenyl, naphthyl, anthracenyl, furyl, thienyl, pyridyl, pyridazyl, pyrimidyl, pyrazyl, triazyl, imidazolyl, pyrazolyl, thiazolyl, benzoimidazolyl, benzoxazolyl, quinazolyl, phthalazyl, pyrrolyl, 2-quinolyl, 1-isoquinolyl, pyrrolidyl, imidazolidyl, morpholyl group, oxazolidyl, 2-tetrahydrofuranyl, 2-tetrahydrothienyl, 2-tetrahydropyranyl, 3-tetrahydropyranyl, chlorine atom, bromine atom, fluorine atom, fluoromethyl, trifluoromethyl, pentafluoroethyl, or pentafluorophenyl. $R^3$ and $R^4$ may combine with each other to form a ring, $R^5$ and $R^6$ may combine with each other to form a ring, or $R^7$ and $R^8$ may combine with each other to form a ring.

Examples of oxetane compounds represented by formula (IX) are shown, but are not limited thereto.

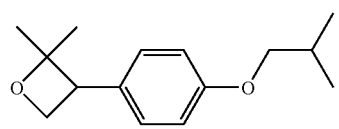

(X)

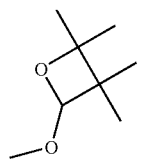

(XI)

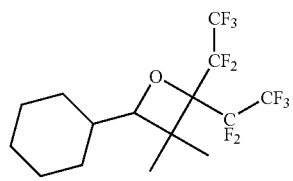

(XII)

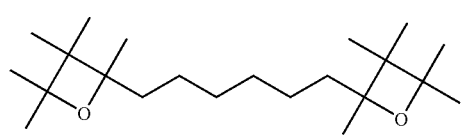

(XIII)

Methods for the synthesis of oxetane compounds are not specifically limited and known methods can be used, including but not limited to that method disclosed in D. B. Pattison, J. Am. Chem. Soc., 3455, 79 (1957).

The composition of the invention also includes an initiator. Typical initiators that may advantageously used comprise iodonium salts, sulfonium salts, acylium salts, tropylium salts, oxonium salts, or the like. These salts comprise a cationic portion and an anionic counterion portion. Such salts may be represented in a generic form as follows: $B^+A^-$; wherein B is the cationic part of the salt, while the A is the anionic part of the salt. Without being bound to any theory, the mechanism of action of the salts is believed to comprise the formation of a protic acid through the dissociation of the salts in the presence of a protic moiety such as water, followed by the reaction of the protic acid with the cyclic ether to form an oxonium ion, which then forms the propagating head of the polymerization.

In one embodiment, the initiator is an iodonium salt, which contains an $I^+$ moiety. In one particular embodiment, the iodonium salt used is a diaryliodonium salt represented as shown in formula (XIV)

$$Ar-I^+-ArA- \qquad (XIV)$$

wherein Ar represents an aromatic radical and $A^-$ is a complex anion of the type $BF_4^-$, $PF_6^-$, $SbF_6^-$, $AsF_6^-$, $CF_3SO_3^-$, or $(C_6F_5)_4B^-$.

Some exemplary iodonium salts useful in the invention include alkoxy-substituted diaryliodonium salts listed in U.S. Pat. No. 4,992,571. These compounds typically are non-toxic and have good solubility characteristics that may be advantageously used during the polymerization. Illustrative specific diaryliodonium compounds useful in the invention comprise: 4-octyloxyphenyl phenyl iodonium hexafluoroantimonate, diphenyliodonium tetrafluoroborate, diphenyliodonium hexafluorophosphate, diphenyliodonium hexafluoroantimonate, diphenyliodonium tetrakis(pentafluorophenyl(borate)), bis-(4-methylphenyl) iodonium hexafluorophosphate, bis-(4-methylphenyl)iodonium hexafluoroantimonate, bis-(4-methylphenyl)iodonium tetrakis(pentafluorophenyl)borate, phenyl-4-methylphenyliodonium hexafluorophosphate, phenyl-4-methylphenyliodonium hexafluoroantimonate, phenyl-4-methylphenyliodonium tetrakis(pentafluorophenyl)borate, phenyl-4-methoxyphenyliodonium hexafluoroantimonate, phenyl-4-methoxyphenyliodonium tetrakis(pentafluorophenyl)borate, phenyl-3-nitrophenyliodonium hexafluorophenylantimonate, phenyl-3-nitrophenyliodonium tetrakis(pentafluorophenyl)borate, bis(4-tert-butylphenyl)iodonium hexafluoroantimonate, bis(4-tert-butylphenyl) iodonium tetrakis(pentafluorophenyl)borate, phenyl-4-diphenyliodonium hexafluoroantimonate, dinaphthyliodonium hexafluorophosphate, dinaphthyliodonium hexafluoroantimonate, dinaphthyliodonium tetrakis(pentafluorophenyl)borate, bis(4-dodecylphenyl)iodonium hexafluoroantimonate, bis(4-dodecylphenyl)iodonium tetrakis(pentafluorophenyl)borate, 4-methylphenyl-4-isopropylphenyliodonium hexafluoroantimonate, 4-methylphenyl-4-isopropylphenyliodonium tetrakis(pentafluorophenyl)borate, or the like, or mixtures thereof.

Similarly sulfonium compounds having a $S^+$ moiety may be used in the invention. Exemplary sulfonium compounds include triarylsulfonium compounds having formula $Ar_3S^+$ $Z^-$, wherein Z is a non-nucleophilic anion. Included in sulfonium salts are also the phenacyl sulfonium salts. These compounds are also commercially available from various sources.

Acylium ions are generated by the reaction of an acyl halide with an acid such as antimony pentachloride. In some instances these may be generated separately, while in other instances, the acylium ions may be generated in situ. Typical methods of generating acylium salts include the reaction of an acyl halide with a acid salt. One particular example of reacting an aromatic acyl halide with antimony pentachloride is shown in scheme 2.

Scheme 2

Tropylium salts comprise the delocalized carbenium ion, cycloheptatrienylium, $C_7H_7^+$ that are derived formally by detachment of one hydride ion from the $CH_2$ group of cyclohepta-1,3,5-triene and substitution derivatives thereof. Tropylium salts may be prepared by bromination-dehydrobromination of cycloheptatriene, and by the hydride-exchange reaction between cycloheptatriene and triphenylmethyl carbonium ion, also sometimes referred to as trityl carbonium ion. Oxonium ions that are formed by the combination of a Lewis acid such as boron trifluoride, a reactive cyclic ether such as an epoxide taken together with a proton donor may be used to initiate the polymerization of lesser reactive cyclic ethers.

The counterion is also a part of the initiating species. The choice of the counterion will become apparent to one of ordinary skill in the art without undue experimentation. Typical counterions useful in the invention include, but are not limited to, hexafluoroantimonate, hexachloroantimonate, hexafluoroarsenate, tetrafluoroborate, hexafluorophosphate, hexachlorophosphate, tetrakis(pentafluorophenyl)borate and the like, and combinations thereof.

It must be noted that some of the initiator species used here such as tropylium and oxonium salts may be too stable for curing of some cyclic ethers. Thus, an appropriate initiating species must be chosen to effect polymerization of the cyclic ethers in question. The choice of the species will become apparent to one of ordinary skill in the art without undue experimentation.

As also noted, the composition of the invention comprises palladium catalysts having formula $Pd(Q)_2$, wherein Q is at least one ligand selected from the group consisting of a carboxylate, a halide, a ketoester, an ester, a ketone, an hydroxyl, and combinations thereof. Palladium catalysts comprise divalent palladium, represented as palladium(II). Such compounds may be complexes between organic moieties and palladium, such as palladium(II) acetylacetonate, or they may be salts of palladium such as palladium(II) chloride. Any organic ligand may be used to form a complex with palladium (II). Carboxylates may be used herein, including carboxylic acids, carboxylate esters, and carboxylate salts. Thus exemplary palladium(II) compounds useful in the invention include, but are not limited to, palladium(II) benzoate, palladium(II) acetylacetonate, palladium(II) chloride, palladium (II) acetate, palladium(II) isopropyl acetylacetonate, palladium(II) p-toluate, palladium(II) phenolate, palladium(II) fluoride, palladium(II) adipate, palladium(II) pyruvate, palladium(II) stearate, palladium(II) citrate, palladium(II) formate, palladium(II) oleate, palladium(II) carbonate, palladium(II) naphthenoate, palladium(II) gluconate, palladium (II) ascorbate, palladium(II) binaptholate and the like, and combinations thereof. Palladium(II) catalysts of the invention are commercially available from a variety of sources. Alternately, palladium(II) catalysts may be synthesized by techniques known to those of ordinary skill in the art. Standard methods of synthesis include, but are not limited to, reacting a palladium(II) halide with the ligand in the presence of a catalyst in a solvent at a suitable temperature for a suitable amount of time, which will become apparent to those skilled in the art. Subsequently, the product may be purified by standard techniques. Thus, in one particular exemplary embodiment, palladium(II) isopropyl acetylacetonate may be synthesized by reacting palladium(II) chloride with a 2 molar excess of 2,6-dimethylheptanone in acetone in the presence of a large excess of potassium carbonate at 50° C. for 30 hours. Subsequently, the reaction mixture may be cooled and filtered, and the product extracted from the residue using an organic solvent such as methylene chloride, chloroform, diethyl ether or the like.

In one embodiment, the catalyst used is substantially soluble in the composition of the invention. Thus, a substantially homogeneous mixture may be obtained when the components of the composition are mixed. By substantially soluble, it is meant that the composition, when filtered through a 0.2 µm filter shows less than 0.5 wt. % loss in material. In other embodiments the catalyst used is insoluble or only partially soluble in compositions of the invention. This may result in suspensions, colloidal dispersions, or heterogeneous mixtures.

The initiators are present in an amount corresponding to from about 0.1 wt. % to about 10 wt %, based on the total weight of the cyclic ether resin. In other embodiments the initiator is present in an amount corresponding to from about 0.2 wt. % to about 5 wt. %. In certain other embodiments the initiator is present in amount corresponding to from about 0.5 wt. % to about 2 wt. %. The catalyst is present in an amount corresponding to from about 0.01 wt. % to about 5 wt. %. In other embodiments the catalyst is present in an amount corresponding to from about 0.1 wt. % to about 3 wt. %. In yet other embodiments the catalyst is present in an amount corresponding to from about 0.2 wt. % to about 2 wt. %.

The individual components of the composition may be mixed and stored at temperatures that are ambient or lower for some convenient period of time. In an alternate embodiment two of the three components may be mixed together and stored appropriately. In yet another embodiment each individual component may be mixed just prior to the curing process to form the article.

Compositions in embodiments of the invention may further comprise a vinyl ether. Vinyl ethers are generally added to accelerate the polymerization reaction by the formation of a more reactive tertiary oxonium ion. Vinyl ethers are also known in the art as promoters. Typical vinyl ethers that are useful for the invention include, but are not limited to, ethylene oxide, propylene oxide, 2-ethylhexyl vinyl ether, methyl vinyl ether, 2-methoxy propene, ethyl vinyl ether, butyl vinyl ether, methoxy methyl methacrylate, and the like, and combinations thereof.

The compositions may further comprise other additives that do not interfere with the curing process. Such additives may include, for example, colorants, photosensitizers, pigments, tackifiers, surfactants, leveling agents, wetting agents, fillers, extending fillers, particulate fillers, fiberous fillers, and mixtures thereof. The compositions may also optionally comprise reactive additives that may be used to modulate the curing conditions. Such additives may include, but are not limited to, alcohols, phenols, carboxylic acids, carboxylic anhydrides, and the like, and combinations thereof.

The present invention also discloses methods of curing the composition disclosed herein. Thus, in one embodiment, the appropriate amounts of the components of the invention are mixed intimately to form a mixture. Mixing steps may include one or more steps of mechanical stirring, magnetic stirring, blending, dissolving, shaking, or the like. Subsequently, the composition is heated to an appropriate temperature for a sufficient period of time to effect curing. The composition may also be applied onto a surface on which the curing may be done. The surface may be a substrate from which the cured material may be peeled off, or it may be a surface on which a coating is required, or any such situations that require the cured material. The composition on the substrate is heated to the appropriate temperature for a sufficient period of time to effect curing. Heating may be effected by any means known in the art. Thus, in one embodiment, the curing is achieved inside a convection oven. In another embodiment heating may be achieved by an infra-red lamp. The temperature and time of curing depend on the catalyst/initiator system used and may be determined by one of ordinary skill in the art. Differential scanning calorimetry (DSC) is an effective exemplary method to determine temperature and time of curing. The DSC thermograms provide the exotherm of the curing step during a heating scan which may be used to determine the temperature of the curing. Similarly, on an isothermal run during DSC, the thermogram provides the time required to effect complete curing.

Thus, in one embodiment, the curing is effected at a temperature from about 40° C. to about 200° C. In another embodiment, the curing is effected at a temperature from about 50° C. to about 150° C. Further, the curing is effected for a time period of from about 5 minutes to about 60 minutes in one embodiment, and from about 10 minutes to about 40 minutes in another embodiment.

The compositions and the methods described may be advantageously used to make shaped components and articles. Illustrative shaped components and articles comprise automotive components such as body panels, truck beds, protective plates, fenders, spoilers, hoods, doors or lamp reflectors; sanitary articles or household implements; components for buildings, both inside and outside such as doors, windows, and furniture; industrial components, including coils, containers, and radiators; and electrical components, including wound articles, such as coils of electric motors; wind rotor blades for wind turbines; aerospace articles, bridge components, marine articles, sporting goods, pipes, missiles, and the like. The compositions and the methods described may also be advantageously used in composite repair in aerospace composites, marine composites, automotive composites, composite tanks, composite pipes, and the like.

Without further elaboration, it is believed that one skilled in the art can, using the description herein, utilize the present invention to its fullest extent. The following examples are included to provide additional guidance to those skilled in the art in practicing the claimed invention. The examples provided are merely representative of the work that contributes to the teaching of the present application. Accordingly, these examples are not intended to limit the invention, as defined in the appended claims, in any manner.

In the following examples PC-1000 resin was a cycloaliphatic epoxy resin having the chemical name 1,1,3,3-tetramethyl-1,3-bis[2-(7-oxabicyclo[4.1.0]hept-3-yl)ethyl]disiloxane and having a molecular weight of 376 grams per mole (g/mol) obtained from Polyset Co., Mechanicsville, N.Y. The following materials were used as received: phenyl-4-octyloxyphenyliodonium hexafluoroantimonate (OPPI), obtained as UV9392C from General Electric Silicones, Tarrytown, N.Y.; and iodonium-[4-(1-methylethyl)phenyl][4-methylphenyl]tetrakis(pentafluorophenyl)]-borate obtained from Gelest Inc., Morrisville, Pa. Bisphenol A diglycidyl ether (BADGE), bis(3,4-epoxycyclohexylmethyl) adipate (E2), Cu(II) acetylacetonate $(Cu(acac)_2)$, palladium(II) acetylacetonate $(Pd(acac)_2)$, palladium(II) chloride $(PdCl_2)$, and palladium(II) acetate $(PdAc_2)$ were obtained from Aldrich and used as received. Pd(II) isopropylacetylacetonate $(Pd(IPacac)_2)$ was synthesized in the following manner: To a suspension of $PdCl_2$ (0.29 grams (g), 1.64 millimoles (mmol)), and $K_2CO_3$ (0.5528 g, 4.0 mmol) in acetone (3 milliliters (mL)) was added 2,6-dimethylheptanone (0.53 g, 3.36 mmol) and the mixture was heated to 50° C. for 30 hours. The reaction mixture was cooled, evaporated to dryness, dissolved in methylene chloride, and filtered through a 2.54 centimeters (cm) pad of silica gel. The solvent was removed under reduced pressure to acquire 0.39 g of a yellow solid. Phenylazotriphenyl methane was synthesized by the procedure given in Kryger et al., J. Amer. Chem. Soc., vol. 99, no. 23, pp. 7589-7600 (1977). UVI-6976, obtained from Dow Chemical Co., Midland, Mich., was a cationic photoinitiator containing a mixture of triarylsulfonium hexafluoroantimonate salts in propylene carbonate. LOCTITE® HYSOL® EA9390 was a two-part epoxy resin system obtained from Henkel Corporation, Rocky Hill, Conn. DSC thermograms were obtained under a nitrogen atmosphere using a Perkin Elmer instrument.

Example 1 and Comparative Examples 1-3

DSC curing under isothermal conditions: Separate samples of epoxy resin (7 milligrams), initiator (1 wt %) and catalyst (0.5 wt %, unless noted) were taken in a DSC pan and cured at 60° C., 70° C., 80° C. or 90° C. by maintaining them at the respective temperatures isothermally for 60 minutes, and their DSC traces were recorded. The complete curing time was estimated as the time taken for the exotherm peak related to polymerization to reach a near flat baseline estimated as the point on the DSC curve that had a slope less than or equal to 0.02. Table 1 lists the epoxy resin, the initiator and catalyst used at the concentrations indicated, and the time taken for complete curing

TABLE 1

| Example # | Resin | Initiator/ amount, wt % | Catalyst/ amount, wt % | Temp. ° C. | Time for complete cure, minutes |
|---|---|---|---|---|---|
| Ex. 1 | PC-1000 | OPPI/1 | $Pd(acac)_2$/ 0.5 | 60 | 51.8 |
| | | | | 70 | 23.9 |
| | | | | 80 | 16.0 |
| | | | | 90 | 13.0 |
| C. Ex. 1 | PC-1000 | OPPI/1 | $Cu(acac)_2$/ 0.5 | 60 | >70 |
| | | | | 70 | >70 |
| | | | | 80 | 30.5 |
| | | | | 90 | 22.3 |
| C. Ex. 2 | HYSOL® EA9390 | — | $BF_3$/1.5 | 60 | >70 |
| | | | | 70 | >70 |
| | | | | 80 | 35.0 |
| | | | | 90 | 26.8 |
| C. Ex. 3 | HYSOL® EA9390 | — | — | 60 | >70 |
| | | | | 70 | >70 |
| | | | | 80 | 65.0 |
| | | | | 90 | 52.0 |

Table 1 shows that complete cure was achieved in less than 70 minutes at 60° C. and 70° C. for the $Pd(acac)_2$ catalyzed resins only. In comparative examples the curing of HYSOL® EA9390 occurs at higher temperatures and longer times. Rapid curing at lower temperature for the $Pd(acac)_2$ catalyzed resins is a surprising advantage over comparative curing systems.

Examples 2-7 and Comparative Example 4

Effect of ligand structures in the palladium catalyst on the curing temperature: PC-1000 was cured in a DSC pan using different initiators and catalysts at various concentrations by heating the sample from room temperature at a rate of 10° C. per minute. The parameters measured were the onset temperature of curing, the peak temperature during curing, the completion temperature for curing, and the heat of curing. The results are shown in Table 2.

TABLE 2

| Ex. # | Initiator/ amount, wt % | Catalyst/ amount, wt % | Temperature, °C. | | | ΔH, J/g |
|---|---|---|---|---|---|---|
| | | | Onset | Peak | Completion | |
| Ex. 2 | OPPI/1 | — | 125 | 134 | 150 | 309 |
| Ex. 3 | OPPI/1 | Pd(acac)$_2$/0.5 | 87 | 98 | 115 | 275 |
| Ex. 4 | — | Pd(acac)$_2$/0.5 | 164 | 190 | >200 | 276 |
| Ex. 5 | OPPI/1 | PdCl$_2$/0.3 | 91 | 103 | 116 | 271 |
| Ex. 6 | OPPI/1 | Pd(IPacac)$_2$/0.5 | 103 | 109 | 118 | 319 |
| Ex. 7 | OPPI/1 | Pd(Ac)$_2$/0.5 | 69 | 81 | 94 | 306 |
| C. Ex. 4 | OPPI/1 | Phenylazo triphenyl methane/5 | 99 | 134 | 156 | 231 |

Table 2 shows that curing using phenylazotriphenyl methane as initiator in the absence of catalyst resulted in a broad exotherm peak, indicative of slow initiation kinetics. Also, curing using Pd(acac)$_2$ without OPPI showed an exotherm only above 160° C. In contrast curing in the presence of OPPI initiator and various Pd catalysts resulted in significantly more rapid curing. Table 2 shows that the temperature and time of curing may be modulated by varying the ligand attached to palladium (II). In a particular embodiment, the temperature may be lowered by varying the ligand attached to palladium(II), which results in reducing energy expenditure and making the process economically feasible.

Examples 8-9 and Comparative Examples 5-6

Effect of catalysts on curing of epoxy resins using other initiators: PC-1000 resin was cured with 1.5 wt. % UVI-6976 initiator and 0.5 wt % catalyst in a DSC pan using different catalysts by heating the sample from room temperature at a rate of 10° C. per minute. Table 3 lists catalysts used and their effect on the exotherm temperature during cure. Example 9 is a repeat of Example 8 using a separate batch of Pd(acac)$_2$.

TABLE 3

| Ex. # | Catalyst/ amount, wt % | Temperature, °C. | | | ΔH, J/g |
|---|---|---|---|---|---|
| | | Onset | Peak | Completion | |
| C. Ex. 5 | — | None | None | None | — |
| C. Ex. 6 | Cu(acac)$_2$/0.5 | None | None | None | — |
| Ex. 8 | Pd(acac)$_2$/0.5 | 122 | 140 | 155 | 219 |
| Ex. 9 | Pd(acac)$_2$/0.5 | 127 | 145 | 160 | 221 |

Table 3 shows that the palladium(II) catalysts worked with sulfonium salt UVI-6976 as initiator, which did not occur with copper(II) catalysts.

Examples 10-14

Effect of a comonomer on the curing of epoxy systems: Epoxy resins were cured in the presence of a known amount of 2-ethylhexylvinyl ether, 1 wt. % OPPI and 0.5 wt. % Pd(acac)$_2$ in a DSC pan by maintaining the sample pan isothermally at 82° C. Table 4 lists the epoxy resins used, concentrations of the vinyl ether, and the exotherm temperature during cure.

TABLE 4

| Ex. # | Epoxy Resin | Amount of Vinyl ether, wt % | Time, minutes | | | ΔH, J/g |
|---|---|---|---|---|---|---|
| | | | Onset | Peak | Completion | |
| Ex. 10 | E2[1] | 0.5 | 1.01 | 1.41 | 18.60 | 336 |
| Ex. 11 | E2[1] | 2 | 0.78 | 2.21 | 15.38 | 293 |
| Ex. 12 | PC-1000 | 5 (T758 ®)[3] | 1.13 | 2.53 | 17.2 | 299 |
| Ex. 13 | BADGE[2] | 2 | 0.78 | 1.03 | 15.50 | 306 |
| Ex. 14 | BADGE[2] | 0.5 | 0.88 | 1.01 | 15.81 | 336 |

[1]E2: Bis(3,4-epoxycyclohexylmethyl) adipate
[2]BADGE: Bisphenol A Diglycidyl Ether
[3]T758 ® is Tamanol 758 phenolic novolac resin from Arakawa Chemical company.

The data show that the presence of vinyl ether decreases the curing time as compared to when the curing was done in the absence of the vinyl ether.

Examples 15-20

Effect of varying relative concentrations of catalyst and initiator during the cure of PC-1000 resin system: PC-1000 resin was cured with various amounts of OPPI initiator and Pd(acac)$_2$ catalyst in a DSC pan by heating the sample from room temperature at a rate of 10° C. per minute. Table 5 lists the concentrations of initiator and catalyst, and their effect on the exotherm temperature during cure.

TABLE 5

| Ex. # | Amount of initiator, wt % | Amount of catalyst, wt % | Temperature, °C. | | | ΔH, J/g |
|---|---|---|---|---|---|---|
| | | | Onset | Peak | Completion | |
| Ex. 15 | 0.5 | 0.2 | 87 | 110 | 125 | 294 |
| Ex. 16 | 0.5 | 0.8 | 82 | 101 | 111 | 313 |
| Ex. 17 | 1.0 | 0.5 | 87 | 104 | 114 | 330 |
| Ex. 18 | 1.5 | 0.2 | 95 | 109 | 119 | 280 |
| Ex. 19 | 1.5 | 0.8 | 83 | 100 | 109 | 303 |
| Ex. 20 | 1.0* | 0.5 | 86 | 101 | 112 | 347 |

*Initiator used was iodonium-[4-(1-methylethyl)phenyl][4-methylphenyl]tetrakis-(pentafluorophenyl)]borate.

Table 5 shows the results of the experiments done for the curing of PC-1000 resin. Data shows that various amounts of initiator and catalysts gives rise to different onset, peak and completion temperatures of curing.

Example 21

A rectangular cast form with dimensions of about 60 mm×6 mm×1.5 mm was filled with PC-1000 resin, 1.0 wt % OPPI and 0.5 wt % Pd(acac)$_2$ and cured within a few minutes when placed in a 70° C. oven. DSC isothermal scans of the same resin mixture at 60° C., 70° C., 80° C., or 90° C. showed complete cure ranging from 52 minutes to 13 minutes, respectively. When Cu(acac)$_2$ was substituted for Pd(acac)$_2$ at 0.5 wt. % in the same resin mixture, the time to complete cure was about two times that of the Pd(acac)$_2$ mixture curing time at all temperatures.

While the invention has been illustrated and described in typical embodiments, it is not intended to be limited to the details shown, since various modifications and substitutions can be made without departing in any way from the spirit of the present invention. As such, further modifications and equivalents of the invention herein disclosed may occur to persons skilled in the art using no more than routine experimentation, and all such modifications and equivalents are believed to be within the spirit and scope of the invention as defined by the following claims. All patents and published articles cited herein are incorporated herein by reference.

The invention claimed is:

1. A thermally curable composition comprising:
   (i) a cyclic ether;
   (ii) an initiator selected from the group consisting of an iodonium salt, a sulfonium salt, an acylium salt, a tropylium salt, an oxonium salt, and combinations thereof; and
   (iii) a catalyst having structure $Pd(Q)_2$,
      wherein Q is at least one ligand selected from the group consisting of a carboxylate, a halide, a ketoester, an ester, a ketone, an hydroxyl, and combinations thereof.

2. The thermally curable composition of claim 1, wherein the cyclic ether comprises at least one epoxy group, at least one oxetane group, or combinations thereof.

3. The thermally curable composition of claim 1, wherein the catalyst is selected from the group consisting of palladium(II) acetylacetonate, palladium(II) chloride, palladium(II) isopropyl acetylacetonate, palladium(II) acetate, and combinations thereof.

4. The thermally curable composition of claim 1, wherein the catalyst is substantially soluble or at least partially soluble in the cyclic ether.

5. The thermally curable composition of claim 1, wherein the catalyst is insoluble in the cyclic ether.

6. The thermally curable composition of claim 1, further comprising a vinyl ether.

7. The thermally curable composition of claim 6, wherein the vinyl ether is selected from the group consisting of 2-ethylhexyl vinyl ether, methyl vinyl ether, 2-methoxy propene, ethyl vinyl ether, butyl vinyl ether, and combinations thereof.

8. A partially cured composition of claim 1.

9. A cured composition of claim 1.

10. A coated article made from the composition of claim 9.

11. A method of curing an epoxy composition comprising the steps of:
    (A) providing a curable composition comprising
       (i) a cyclic ether,
       (ii) an initiator selected from the group consisting of an iodonium salt, a sulfonium salt, an acylium salt, a tropylium salt, an oxonium salt, and combinations thereof, and
       (iii) a catalyst having structure $Pd(Q)_2$,
          wherein Q is at least one ligand selected from the group consisting of a carboxylate, a halide, a ketoester, an ester, a ketone, an hydroxyl, and combinations thereof; and
    (B) heating the curable composition at a temperature and for a period of time to effect curing.

12. The method of claim 11, wherein the cyclic ether comprises at least one epoxy group, at least one oxetane group, or combinations thereof.

13. The method of claim 11, wherein the catalyst is selected from the group consisting of palladium(II) acetylacetonate, palladium(II) chloride, palladium(II) isopropyl acetylacetonate, palladium(II) acetate, and combinations thereof.

14. The method of claim 11, wherein the curable composition is coated onto a substrate.

15. The method of claim 11, wherein the temperature is in a range of from about 40° C. to about 200° C.

16. The method of claim 11, wherein the temperature is in a range of from about 50° C. to about 150° C.

17. The method of claim 11, wherein the time of curing is in a range of from about 5 minutes to about 60 minutes.

18. The method of claim 11, wherein the time of curing is in a range of from about 10 minutes to about 40 minutes.

19. A partially cured composition made by the method of claim 11.

20. A cured composition made by the method of claim 11.

21. An article made from the composition of claim 20.

22. An article made by the method of claim 11.

23. A thermally curable coating composition consisting essentially of:
    (i) a cyclic ether that comprises at least one epoxy group, at least one oxetane group, or combinations thereof;
    (ii) a catalyst selected from the group consisting of palladium(II) acetylacetonate, palladium(II) chloride, palladium(II) isopropyl acetylacetonate, palladium(II) acetate, and combinations thereof; and
    (iii) an initiator selected from the group consisting of an iodonium salt, a sulfonium salt, an acylium salt, a tropylium salt, an oxonium salt, and combinations thereof.

24. The thermally curable coating composition of claim 23, wherein the catalyst is substantially soluble or at least partially soluble in the cyclic ether.

25. The thermally curable coating composition of claim 23, wherein the catalyst is insoluble in the cyclic ether.

26. The thermally curable coating composition of claim 23, further comprising a vinyl ether.

27. The thermally curable coating composition of claim 26, wherein the vinyl ether is selected from the group consisting of 2-ethylhexyl vinyl ether, methyl vinyl ether, 2-methoxy propene, ethyl vinyl ether, butyl vinyl ether, and combinations thereof.

* * * * *